(12) United States Patent
Chiu

(10) Patent No.: US 7,554,077 B2
(45) Date of Patent: Jun. 30, 2009

(54) ENCODER

(75) Inventor: Sean Chiu, Escondido, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 122 days.

(21) Appl. No.: 11/626,782

(22) Filed: Jan. 24, 2007

(65) Prior Publication Data

US 2008/0173802 A1 Jul. 24, 2008

(51) Int. Cl.
G01D 5/34 (2006.01)
G01B 11/14 (2006.01)
H03M 11/00 (2006.01)

(52) U.S. Cl. .................... 250/231.13; 250/231.18; 356/617; 341/31

(58) Field of Classification Search .................
250/231.11–231.18, 237 R, 237 G; 341/11, 341/13, 31, 3; 33/1 PT, 1 N; 356/616, 617
See application file for complete search history.

(56) References Cited

U.S. PATENT DOCUMENTS

| 5,438,193 | A  | * | 8/1995 | Takagi et al. ........... 250/231.18 |
| 6,915,471 | B2 | * | 7/2005 | Miller .................... 714/738 |
| 7,021,735 | B2 | * | 4/2006 | Spicer ................... 347/19 |
| 7,193,534 | B2 | * | 3/2007 | Hung ..................... 341/13 |
| 2006/0022126 | A1 | * | 2/2006 | Chong et al. ........... 250/231.13 |

OTHER PUBLICATIONS

Histand & Alciatore, "Introduction to Mechatronics and Measurement Systems," McGraw Hill 1999 (accessed and printed from Internet).

* cited by examiner

*Primary Examiner*—Georgia Y Epps
*Assistant Examiner*—Don Williams

(57) ABSTRACT

Embodiments of an encoder are disclosed.

19 Claims, 6 Drawing Sheets

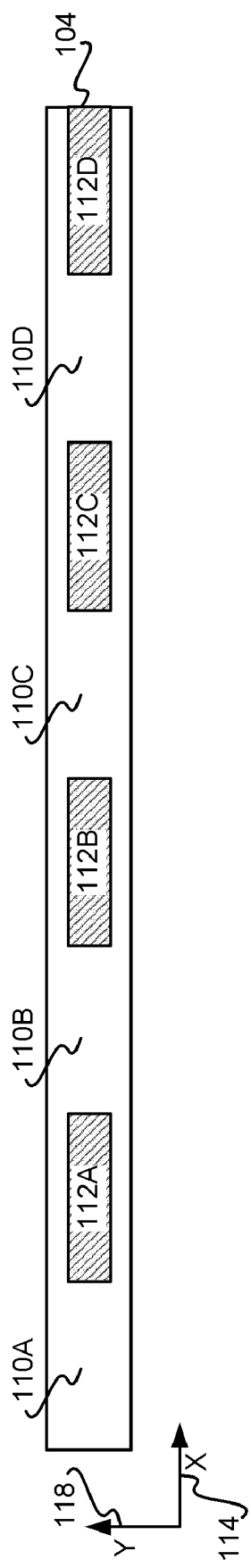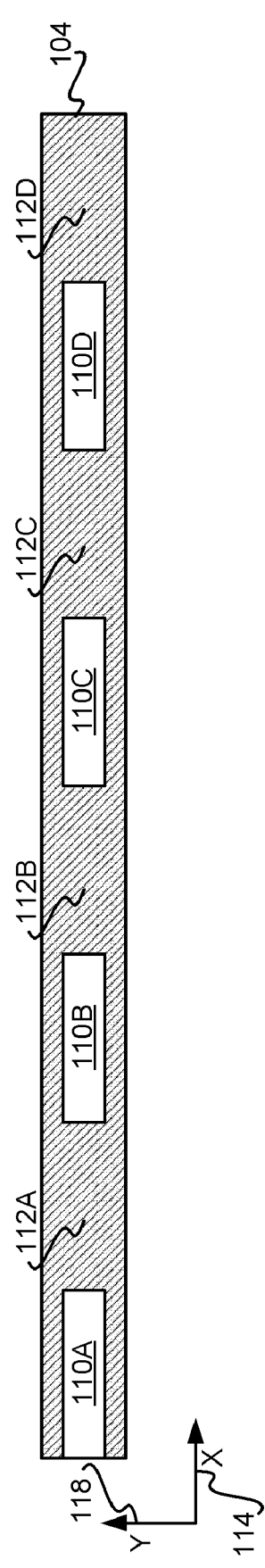

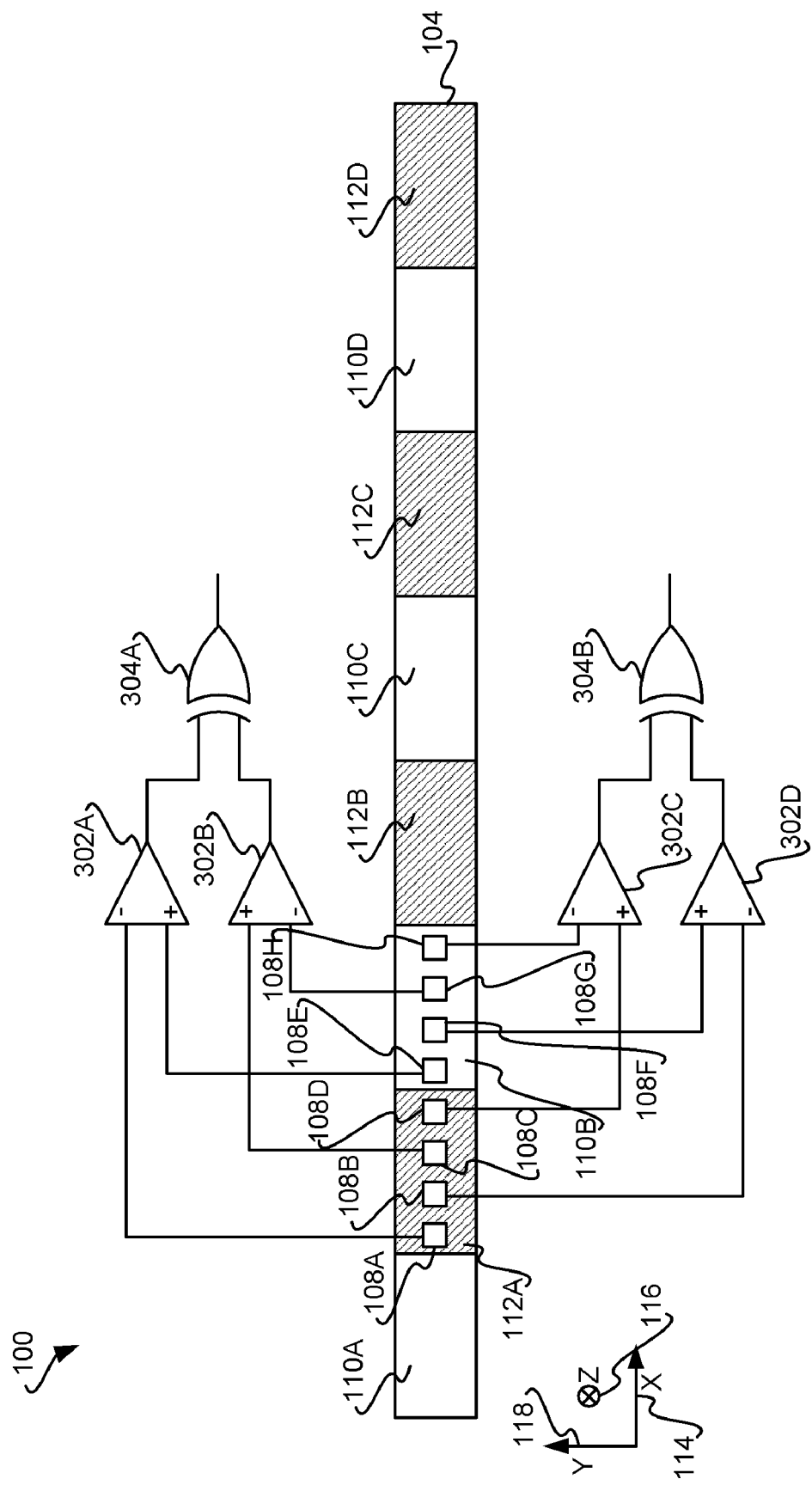

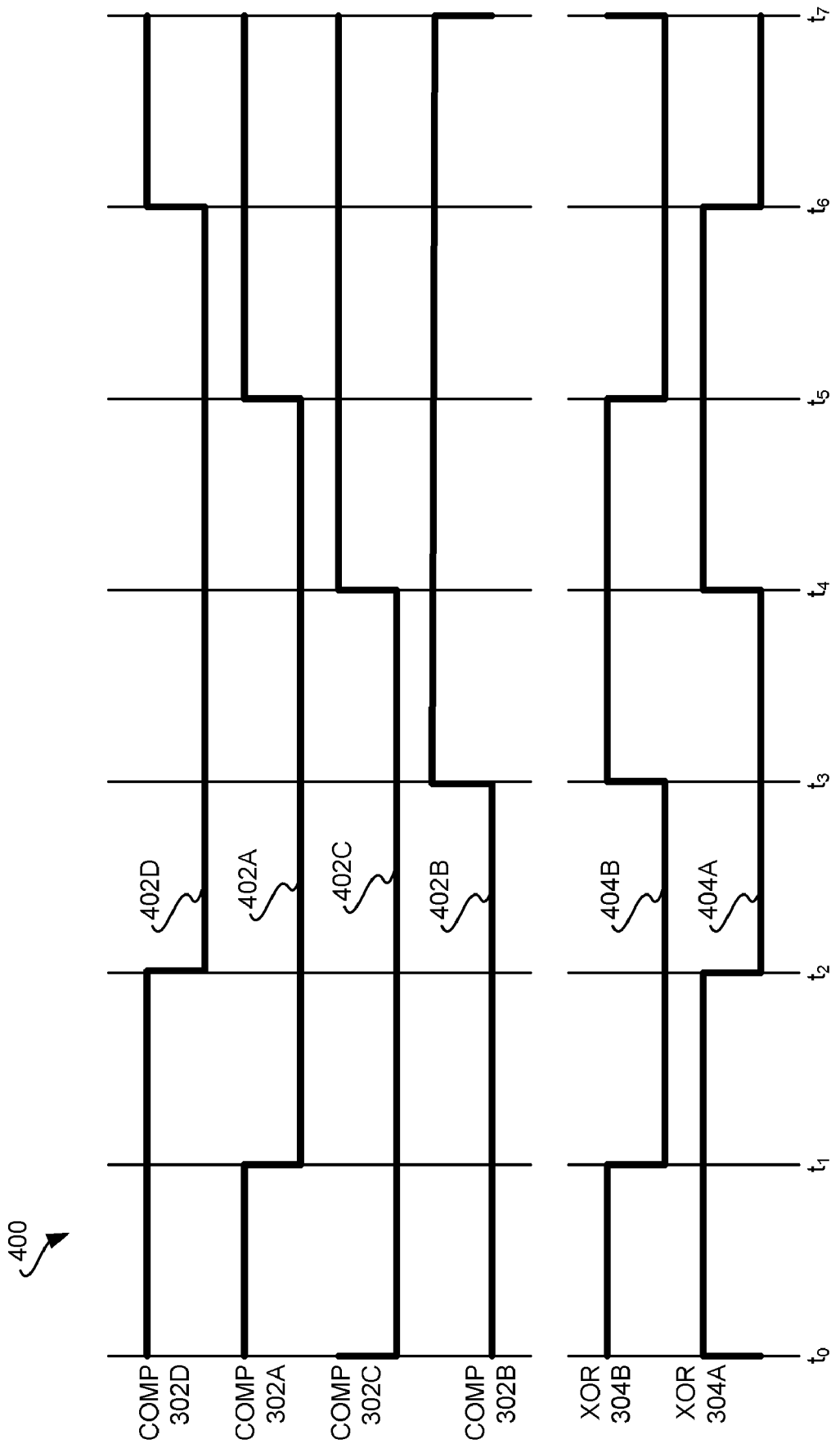

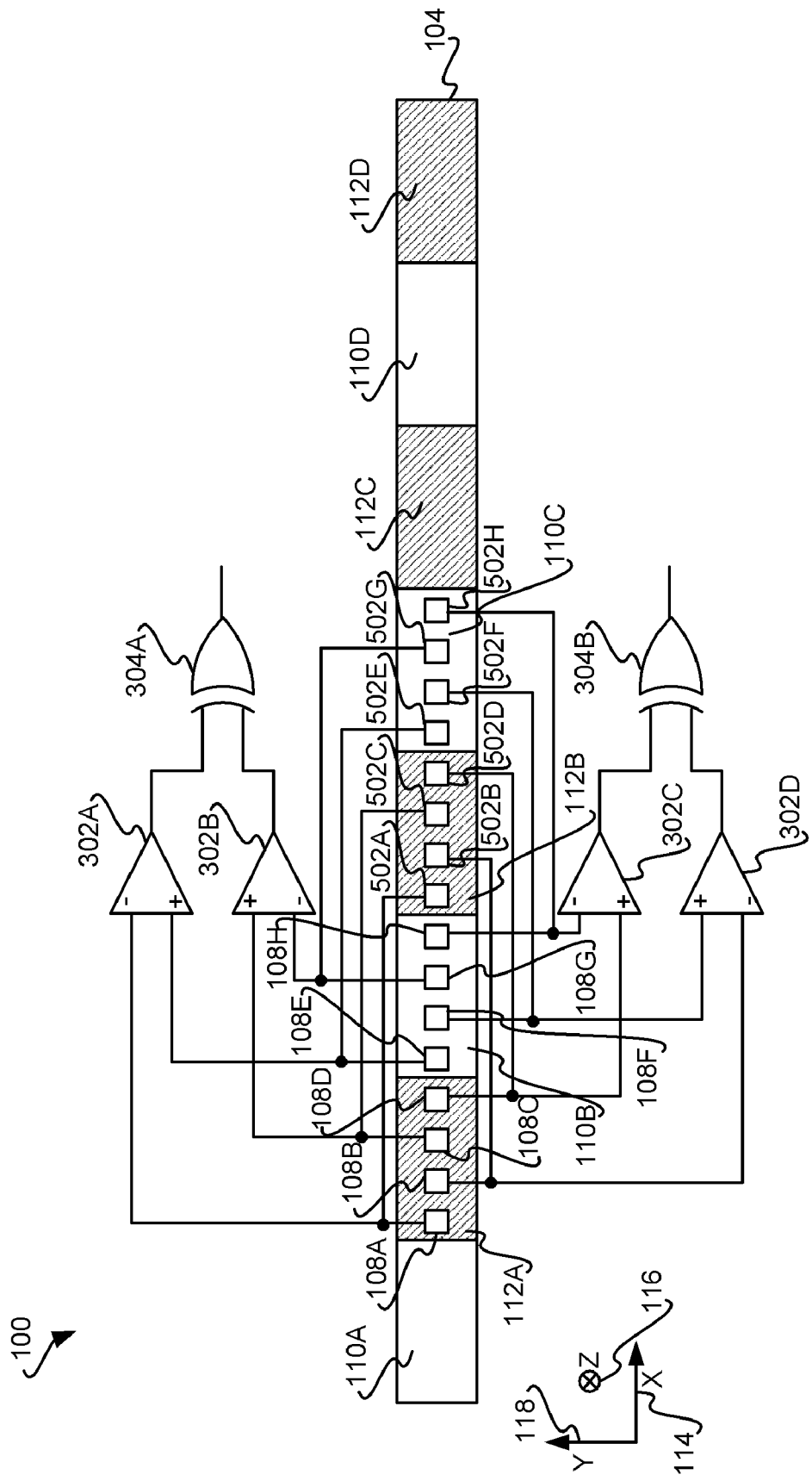

ENCODER

BACKGROUND

Inkjet-printing devices, and other types of printing devices, eject ink onto a sheet of media in accordance with a desired image. It is desirable to track the movement of an inkjet-printing mechanism in relation to the media sheet swath currently incident to the mechanism. Encoders are devices employed to track the movement of such inkjet-printing mechanisms. As the desired printing resolutions of inkjet-printing and other printing devices have increased, however, increasing the corresponding resolution of encoders has become difficult and expensive.

BRIEF DESCRIPTION OF THE DRAWINGS

FIGS. 2A and 2B are diagrams of code strips for a digital encoder, according to different embodiments of the present disclosure.

FIG. 3 is a diagram of a digital encoder that has a resolution greater than the resolution of its constituent code strip, according to an embodiment of the present disclosure.

FIG. 4 is a timing diagram of various responses within the digital encoder of FIG. 3 over time, according to an embodiment of the present disclosure.

FIG. 5 is a diagram of a digital encoder that has an extra array of optical sensors for redundancy, according to an embodiment of the present disclosure.

DETAILED DESCRIPTION

Figure 1A:
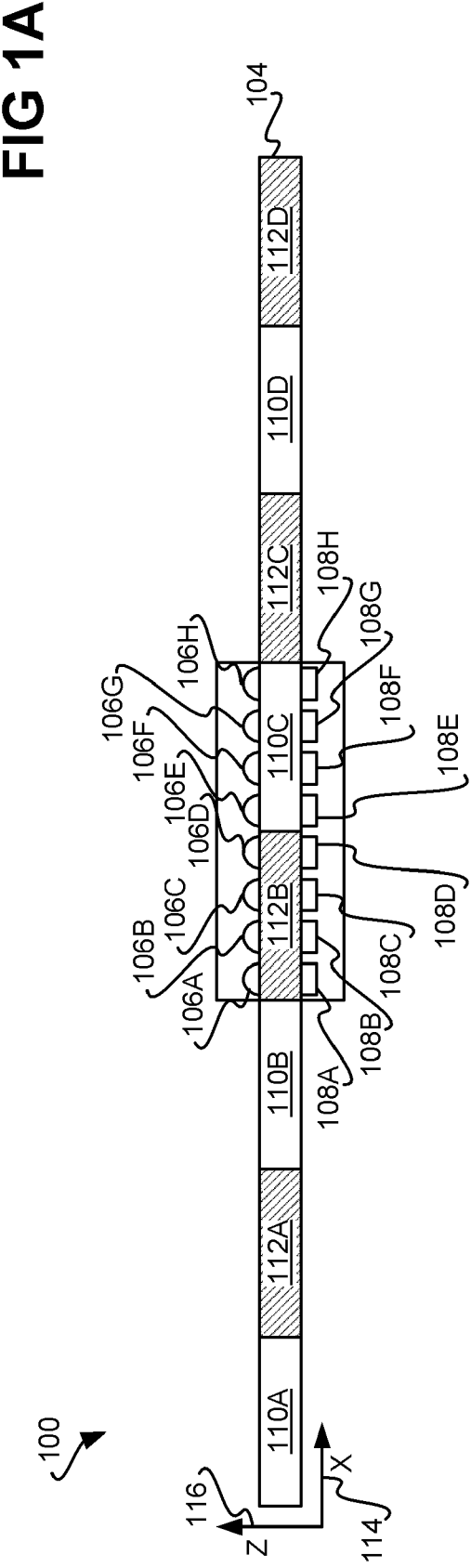
FIGS. 1A and 1B are front view and side view diagrams, respectively, of a digital encoder, according to an embodiment of the present disclosure.
Figure 1B:
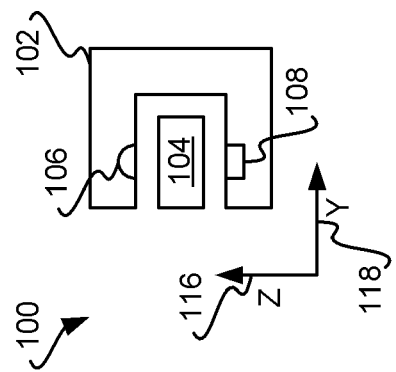

FIGS. 1A and 1B show a front view and a side view, respectively, of a digital encoder 100, according to an embodiment of the present disclosure. The front view of the digital encoder 100 of FIG. 1A depicts the encoder 100 along an x-axis 114 and a z-axis 116 as shown. The side view of the digital encoder 100 of FIG. 1B depicts the encoder 100 along a y-axis 118 and the x-axis 116 as shown.

The digital encoder 100 is a device that is able to track the movement of a component along a dimension, such as along the dimension of the x-axis 114. The digital encoder 100 achieves this functionality by outputting one or more signals corresponding to the movement of the component along the dimension in question. The signals are discrete in that they are made up of pulses that together signify how much the component has moved, via a number of different digital encoder states, such that the movement from one state to another state indicates that the component has moved by a given distance. The operation of the digital encoder 100 is described in more detail later in the detailed description.

The digital encoder 100 includes a code strip 104, a number of light emitters 106A, 106B, 106C, 106D, 106E, 106F, and 106G, collectively referred to as the light emitters 106, an array of optical sensors 108A, 108B, 108C, 108D, 108E, 108F, and 108G, collectively referred to as the optical sensors 108, and a hardware circuit, which is not depicted in FIGS. 1A and 1B. For exemplary purposes, the light emitters 106 and the optical sensors 108 are depicted in FIGS. 1A and 1B as being disposed on a mounting bracket 102. However, the light emitters 106 and the optical sensors 108 may be disposed or situated in a different manner as well. The number of emitters 106 may be different from the number of optical sensors 108, and there may be just one emitter 106.

The code strip 104 is disposed, or positioned, between the light emitters 106 and the optical sensors 108, and may be stationary. As will be described herein, the optical sensors 108 can move and the code strip 104 is stationary. However, alternatively, the code strip 104 may move and the optical sensors 108 may be stationary, as those of ordinary skill within the art can appreciate. The light emitters 106 can be light-emitting diodes (LED's), or other types of light emitters. In the embodiment of FIGS. 1A and 1B, the number of light emitters 106 is equal to the number of optical sensors 108, and each light source is situated opposite a corresponding optical sensor. However, in another embodiment, there may be less or more in number of light emitters 106 as compared to the optical sensors 108. For instance, the light emitters 106 may include a light strip, or bar, corresponding in length substantially to the length of the code strip 104, or a single light source of wide dispersion with or without an optical lens mechanism, as can be appreciated by those of ordinary skill within the art. The optical sensors 108 can be photodiodes, or other types of optical sensors. While there are eight optical sensors 108 in the embodiment of FIGS. 1A and 1B, in other embodiments there may be less or more of the optical sensors 108.

Furthermore, in the embodiment of FIGS. 1A and 1B, the mounting bracket 102 is able to move along the x-axis 114, while the code strip 104 remains stationary, and such that both the light emitters 106 and the optical sensors 108 move in unison with the bracket 102 due to their being situated on the bracket 102. However, in another embodiment, the light emitters 106 may not move in unison with the bracket 102 and the optical sensors 108. For instance, where the light emitters 106 include a light strip, or bar, having a length substantially equal to the length of the code strip 104, the light strip may remain stationary as the bracket 102 and the optical sensors 108 move.

The code strip 104 contains a number of light regions 110A, 110B, 110C, and 110D, collectively referred to as the light regions 110, and a corresponding number of dark regions 112A, 112B, 112C, and 112D, collectively referred to as the dark regions 112. The light regions 110 and the dark regions 112 are interleaved with one another, defining a number of light region-dark region pairs. A light region is defined as a region that substantially allows light to pass therethrough, such that it is at least substantially transparent. A dark region is defined as a region that substantially prohibits light to pass therethrough, such that it is at least substantially opaque.

The code strip 104 has a resolution. The resolution of the code strip 104 is defined as the number of light region-dark region pairs per unit of distance. For example, there may be 75 pairs of light and dark regions per inch, such that this is the resolution of the code strip 104. As such, the size of the light regions 110 and the dark regions 112 in FIGS. 1A and 1B is exaggerated for illustrative clarity and convenience. To those of ordinary skill within the art, this resolution may also be expressed as 75 lines-per-inch (LPI).

The array of optical sensors 108 also has a resolution. The resolution of the array of optical sensors 108 is defined as the number of optical sensors 108 per unit of distance, divided by the number of unique digital encoder states that can be output by the digital encoder 100, and by which the movement of the bracket 102 in relation to code strip 104 is determined.

Unique digital encoder states are described in more detail later in the detailed description. The eight optical sensors 108 may be situated with a length of 1/75 of an inch, and there may be four unique digital encoder states, for instance, such that the resolution of the array of optical sensors 108 is 8 times 75 divided by four, or 150. As such, the size of the optical sensors in FIG. 1 is exaggerated for illustrative clarity and convenience. To those of ordinary skill within the art, this resolution may also be expressed as 150 LPI.

In the example of FIG. 1, the optical sensors 108A, 108B, 108C, and 108D are incident to the dark region 112B of the code strip 104, while the optical sensors 108E, 108F, 108G, and 108H are incident to the light region 110C of the code strip 104. The light output by the light emitters 106A, 106B, 106C, and 106D is substantially not detected by the optical sensors 108A, 108B, 108C, and 108D, respectively, because the dark region 112B at least substantially prevents the light from being transmitted therethrough, such that none or substantially less of the light reaches these optical sensors. By comparison, the light output by the light emitters 106E, 106F, 106G, and 106H is detected by the optical sensors 108E, 108F, 108G, and 108H, respectively, because the light region 110C at least substantially permits the light from being transmitted therethrough, such that substantially more intense light reaches these optical sensors.

FIGS. 2A and 2B show the code strip 104 along the x-axis 114 and the y-axis 118, according to different embodiments of the present disclosure. In FIG. 2A, the code strip 104 is initially at least substantially transparent, such that the dark regions 112 are defined by printing, photo-developing, or another way of making an at least substantially opaque material on the code strip 104. In FIG. 2B, the code strip 104 is initially at least substantially opaque, such that the light regions 112 are defined by creating windows, or slits, within the code strip 104.

FIG. 3 shows the digital encoder 100, according to an embodiment of the present disclosure. The view of the digital encoder 100 in FIG. 3 is within the x-y plane defined by the x-axis 114 and the y-axis 118, looking from the bottom of the digital encoder 100 in FIG. 1, such that the z-axis 116 is pointed into the x-y plane. The optical sensors 108 are thus depicted before, or over, the code strip 104 in the view of FIG. 3. The light emitters 106 are hidden within the view of FIG. 3, behind the depicted code strip 104.

The hardware circuit of the digital encoder 100 includes four comparators 302A, 302B, 302C, and 302D, collectively referred to as the comparators 302, and two exclusive-or (XOR) gates 304A and 304B, collectively referred to as the XOR gates 304. The comparators 302 and the XOR gates 304 may be implemented within the same integrated circuit (IC) containing the optical sensors 108. In another embodiment, part of the hardware circuit may be situated externally from the IC containing the optical sensors 108 and/or the comparators 302.

The outputs of the optical sensors 108A and 108E are connected to the negative and positive inputs, respectively, of the comparator 302A. The outputs of the optical sensors 108C and 108G are connected to the positive and negative inputs, respectively, of the comparator 302B. The outputs of the optical sensors 108D and 108H are connected to the positive and negative inputs, respectively, of the comparator 302C. The outputs of the optical sensors 108B and 108F are connected to the negative and positive inputs, respectively, of the comparator 302D. The inputs of the comparators 302 may together be considered the inputs of the hardware circuit of which the comparators 302 are a part. It is noted that this number of inputs is equal to the number of optical sensors 108 in one embodiment of the present disclosure.

Each of the optical sensors 108 outputs a relatively strong signal when it detects strong light, and otherwise outputs relatively weak signal, when it detects less light. Each of the comparators 302 outputs whether its positive input is greater than its negative input. If the positive input of a comparator is greater than the negative input of the comparator, than the comparator outputs logic one, or high. Otherwise, the comparator outputs logic zero, or low.

The outputs of the comparators 302A and 302B are connected to the inputs of the XOR gate 304A, and the outputs of the comparators 302C and 302D are connected to the inputs of the XOR gate 304B. Each of the XOR gates 304 performs a logic XOR operation based on its inputs. If two inputs of the XOR gate are different, such that either, but not both, of the inputs of an XOR gate is logic one, or high, then the output of the XOR gate is logic one, or high. If both of the inputs of the XOR gate are equal to one another—such that both are equal to logic one, or high, or both are equal to logic zero, or low—then the output of the XOR gate is logic zero, or low.

The concatenation of the outputs of the XOR gates 304 defines the digital encoder state of the digital encoder 100. Because each XOR gate can output either 0 or 1, there are thus four unique digital encoder states for outputs AB: 11, 10, 00, and 01 respectively. The first state 11 corresponds to both the XOR gates 304 outputting logic one. The second state 10 corresponds to the XOR gate 304A outputting logic one and the XOR gate 304B outputting logic zero. The third state 00 corresponds to both the XOR gates 304 outputting logic zero. The fourth state 01 corresponds to the XOR gate 304A outputting logic zero and the XOR gate 304B outputting logic one.

The outputs of the XOR gates 304 may be considered the outputs of the hardware circuit of which the XOR gates 304 are a part. The number of unique digital encoder states corresponds to the number of unique combinations of values of these outputs. As has been stated, since each XOR gate can output two different values, and since there are two XOR gates 304, the number of unique digital encoder states is equal to the number of unique combinations of these values from these XOR gates 304, or $2^2$.

As the optical sensors 108 move relative to the code strip 104, different optical sensors change output as they begin to detect light or stop detecting light. For example, in FIG. 3 as shown, the optical sensors 108A, 108B, 108C, and 108D are substantially not detecting light, because they are incident to the dark region 112A, which blocks the light from reaching these sensors. Therefore, the optical sensors 108A, 108B, 108C, and 108D output weak signals. By comparison, the optical sensors 108E, 108F, 108G, and 108H are detecting light, because they are incident to the light region 110B, which permits the light to reach these sensors. Therefore, the optical sensors 108E, 108F, 108G, and 108H output strong signals.

When the optical sensors 108 are moved in unison to the left by a small amount, the optical sensor 108E moves from the light region 110B to the dark region 112A, and therefore outputs a weak signal instead of a strong signal. Similarly, the optical sensor 108A moves from the dark region 112A to the light region 110A, and therefore outputs a strong signal instead of a weak signal. Output of the comparator 302A thus changes from a previous state high, or logic one, to a new state low, or logic zero. Each time the optical sensors 108 are sufficiently moved in unison to the left, one of the optical sensors 108 is moved from a light region to a dark region, and begins to output a weak signal instead of a strong signal, and one of the optical sensors 108 is moved from a dark region to a light region, and begins to output a strong signal instead of a weak signal. This triggers the corresponding comparator to change state: from logic zero to logic one, or from state high to state low, and vice versa. The changing instances of the comparators register the movement at the resolution of the optical sensor array. The XOR gates 304 that follow these comparators reconstruct the normal quadrature signals without loss of the registration and resolution, as explained below.

FIG. 4 shows a timing diagram 400 of the outputs of the comparators 302 and of the XOR gates 304, according to an embodiment of the present disclosure. The responses 402A, 402B, 402C, and 402D, collectively referred to as the responses 402, indicate the outputs of the comparators 302A, 302B, 302C, and 302D, respectively, as the sensors 108 move from right to left. Likewise, the responses 404A and 404B, collectively referred to as the responses 404, indicate the outputs of the XOR gates 304A and 304B, respectively, as the sensors 108 move from left to right.

Therefore, from time $t_0$ through time $t_7$, the digital encoder states are 11, 10, 00, 01, 11, 10, 00, 01, and so on. There are thus four unique digital encoder states: 11, 10, 00, and 01, which repeat in that order. The four states indicate direction, and amount of movement: distance based on resolution, speed based on distance and elapsed time, and acceleration. The digital encoder 100 is thus a digital quadrature encoder, in that it has four unique digital encoder states. The hardware circuit encompassing the comparators 302 and the XOR gates 304 thus outputs the unique digital encoder states in this order, based on the outputs of the optical sensors 108. The alternate order 11, 01, 00, 10, and so on, is also possible by swapping the two outputs. To those of ordinary skill within the art, the four unique digital encoder states are similar to a typical quadrature encoder's outputs. As a result, embodiments of the present disclosure can be employed as "drop-in" replacements for typical quadrature encoders.

It is noted that the embodiment of FIGS. 3 and 4 employs a code strip 104 that has a resolution of 75 LPI, but an array of optical sensors 108 that has a resolution of 150 LPI. The resolution of the digital encoder 100 itself is equal to that of the array of optical sensors 108, and thus is 150 LPI. Therefore, embodiments of the present disclosure provide for a digital encoder to have a resolution that is greater than the resolution of its constituent code strip, and equal to the resolution of its constituent array of optical sensors. This is advantageous, because it can be difficult and/or expensive to fabricate code strips with relatively high resolutions. The configuration of the hardware circuit encompassing the comparators 302 and the XOR gates 304 provides the digital encoder 100 to have a resolution equal to that of the array of optical sensors 108, and greater than that of the code strip 104.

It is noted that the hardware circuit of FIG. 3 provides the digital encoder 100 with a resolution greater than the resolution of the code strip 104 without performing interpolation, such as estimating the minute distance traveled based on minute elapsed time, assuming a certain predetermined and presumed speed. That is, the outputs of the optical sensors 108 are not interpolated in any way to achieve the unique digital encoder states at the resolution of 150 LPI. None of these unique digital encoder states is generated using interpolation methodologies. Rather, each unique digital encoder state is generated by a change in the output of one of the optical sensors 108. As such, the reliability of outputting such digital encoder states at this resolution is ensured, even during hard acceleration or deceleration, or due to external disturbances.

Furthermore, in other embodiments of the present disclosure, by employing different types of hardware circuits, ratios of the resolution of the array of optical sensors to the resolution of the code strip other than 2:1, as in the embodiment of FIGS. 3 and 4, can be achieved. In fact, theoretically, the code strip may have a resolution as low as one LPI or lower than one LPI. In practice, ratios of 5:1 to 10:1 provide for extremely high digital encoder resolutions while employing easily fabricated code strips that have relatively low resolutions. Different hardware circuits may be employed, having different components and/or having components connected in a different way, as compared to the comparators 302 and the XOR gates 304 of FIG. 3.

It is noted that embodiments of the present disclosure may employ additional optical sensors that are not part of the array of optical sensors 108. For instance, FIG. 5 shows the digital encoder 100, according to an embodiment of the present disclosure, in which there is another array of optical sensors 502A, 502C, 502D, 502E, 502F, 502G, and 502G, collectively referred to as the optical sensors 502. The optical sensors 502 have outputs that are related to the outputs of corresponding optical sensors 108, such that the output of the sensor 502A is related to the output of the sensor 108A, the output of the sensor 502B is related to the output of the sensor 108B, and so on.

Relating the outputs of corresponding sensors among the optical sensors 502 and the optical sensors 108 permits the averaging of the outputs of two corresponding sensors as an input to one of the comparators 302. Thus, if a given optical sensor 108 is malfunctioning, or is not detecting light properly due to the presence of a contaminant on the code strip 104 and/or on the sensor itself, the corresponding input to the comparator in question is still likely to be correct because of the additional sensor 502, and vice-versa. Therefore, the array of optical sensors 502 provides for redundancy to the array of optical sensors 108.

The optical sensors 502 are positioned adjacent to or accordingly spaced with respect to the optical sensors 108 as is depicted in FIG. 5. More specifically, the optical sensors 108 are arranged in a linear row from left to right, such that at any given time four of the sensors 108 are incident to one or more of the dark regions 112 and the other four are incident to one or more of the light regions 110. Likewise, the optical sensors 502 are arranged in a linear row from left to right adjacent to or accordingly spaced with respect to the optical sensors 108, such that at any given time four of the sensors 502 are incident to one or more of the dark regions 112 and the other four are incident to one or more of the light regions 110. Furthermore, the optical sensors 502 correspond to the optical sensors 108 such that if a given sensor 108 is incident to one of the dark regions 112, the corresponding sensor 502 is also incident to one of the dark regions 112, and if a given sensor 108 is incident to one of the light regions 110, the corresponding sensor 502 is also incident to one of the light regions 110.

Figure 6:
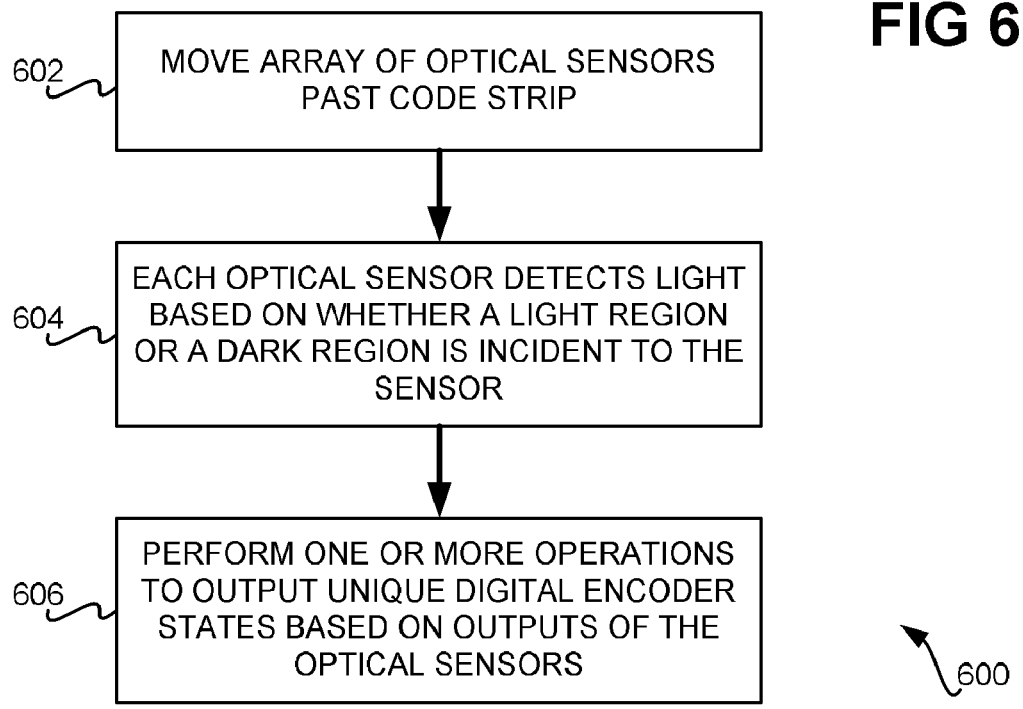
FIG. 6 is a flowchart of a method, according to an embodiment of the present disclosure.

FIG. 6 shows a method 600 that summarizes operation of the digital encoder 100 as has been described, according to an embodiment of the present disclosure. The array of optical sensors 108 is moved past the code strip 104 (602). As the optical sensors 108 move past the code strip 104, each optical sensor detects light from one or more of the light emitters 106 based on whether the sensor is incident to one of the light regions 110 of the code strip 104 or to one of the dark regions 112 of the code strip 104 (604). The hardware circuit performs operations on these outputs of the optical sensors 108 to output the unique digital encoder states (606). The operations in the embodiment of FIGS. 3 and 4, for instance, include four comparison operations and two logic XOR operations.

Figure 7:
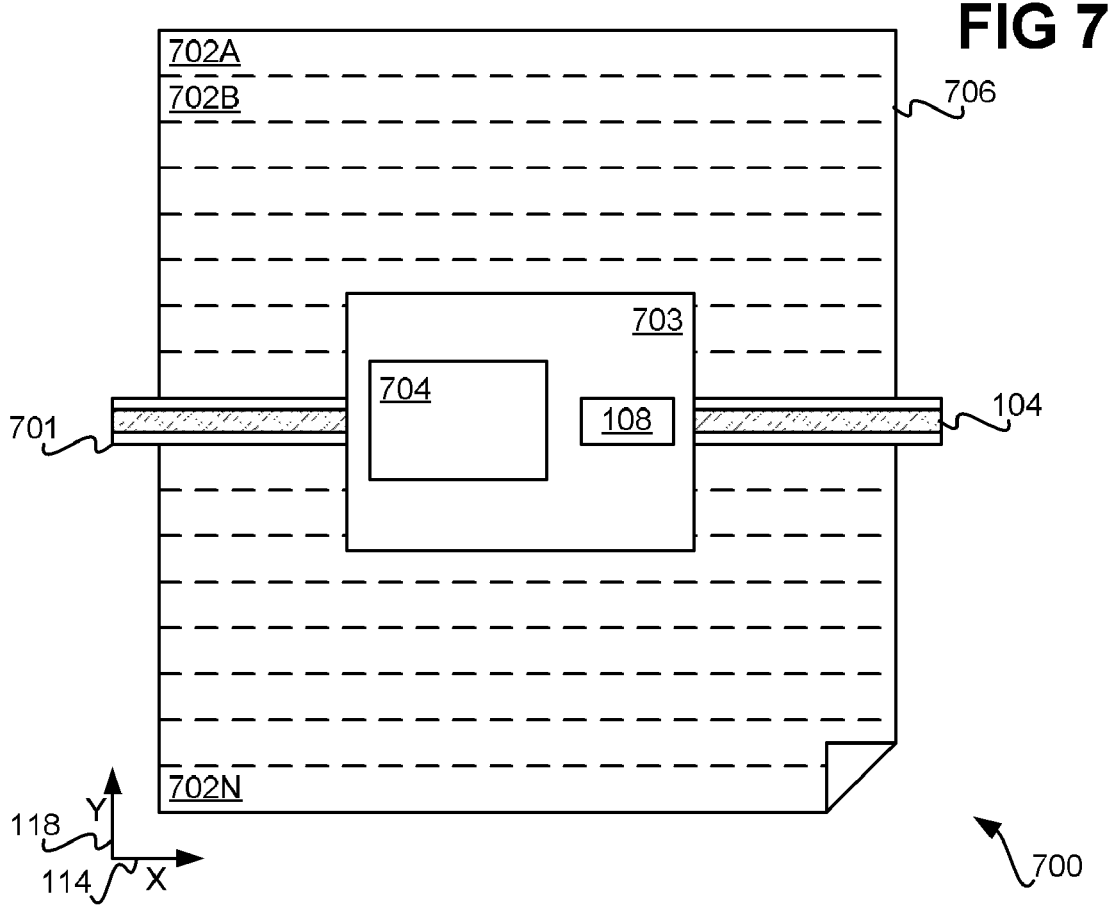
FIG. 7 is a rudimentary diagram of a printing device employing a digital encoder that has a resolution greater than the resolution of the encoder's code strip, according to an embodiment of the present disclosure.

FIG. 7 shows how a rudimentary printing device 700 may employ the digital encoder 100 that has been described, according to an embodiment of the present disclosure. The printing device 700 is depicted in FIG. 7 as including a carriage 703 with a printing mechanism 704, as well as a code strip 104 having its length running along the dimension of the x-axis 114 on a stationary portion 701 of the printing device 700. As can be appreciated by those of ordinary skill within the art, the printing device 700 can include other components, besides those shown in FIG. 7, such as rollers, motors, power supplies, and so on, which are not depicted nor described herein insofar as they are not relevant to the employment of the digital encoder 100.

The digital encoder 100 is depicted in FIG. 7 insofar as two of its constituent components are shown: the array of optical sensors 108 situated on the carriage 703, and the code strip 104 running along the x-axis 114 on the stationary portion 701 of the printing device 700. The printing device 700 is said to include the digital encoder 100 in one embodiment of the present disclosure, insofar as it includes the optical sensors 108 and the code strip 104. The printing mechanism 704 may be an inkjet-printing mechanism, for instance, such that the printing device 700 is an inkjet-printing device, such as an inkjet printer.

A sheet of media 706 is advanced on a swath-by-swath basis along the dimension of the y-axis 118, and thus perpendicular to the dimension along which the printing mechanism 704 and the digital encoder 108 on the carriage 703 are moving in unison with the carriage 703 as the carriage 703 moves along the x-axis 114. The media sheet 706, which may be paper, has a number of swaths 702A, 702B, ..., 702N, collectively referred to as the swaths 702. The height of each of the swaths 702 corresponds to the maximum height that the printing mechanism 704 can print on the media sheet 706 at a given time.

The printing device 700 thus works as follows. The first swath 702A of the media sheet 706 is incident to the printing mechanism 704. The printing mechanism 704 moves over this first swath 702 along the x-axis 114 one or more times, printing on the swath 702A as it moves. The digital encoder 100 (i.e., including the code strip 104 and the optical sensors 108) is used so that the printing device 700 can track movement of the printing mechanism 704, such that the printing mechanism 704 properly prints on the swath 702A. Once the swath 702A has been printed on, the sheet 706 is advanced so that the next swath 702B is incident to the printing mechanism 704. This process is repeated until the printing mechanism 704 has printed on all the swaths 702 as desired to print a desired image on the media sheet 706. As depicted in FIG. 7, for instance, the media sheet 706 has been advanced so that one of the middle swaths is incident to the printing mechanism 704.

I claim:

1. An encoder comprising:
    a code strip having a first resolution;
    one or more light emitters;
    an array of optical sensors having a second resolution; and,
    a hardware circuit to output unique encoder states based on outputs of the optical sensors at a resolution equal to the second resolution,
    wherein the second resolution is greater than the first resolution, and
    wherein the hardware circuit comprises:
        a plurality of comparators, each comparator comparing the outputs of two of the optical sensors; and,
        one or more exclusive-or (XOR) gates, each XOR gate performing a logic XOR operation on outputs of two different comparators of the comparators, such that the output of each comparator is connected to just one of the XOR gates, and such that all the comparators are connected to the XOR gates.

2. The encoder of claim 1, wherein the code strip comprises a plurality of interleaved dark regions and light regions, the first resolution defined as a number of dark region-light region pairs per distance unit, the dark regions of the code strip being opaque and the light regions of the code strip being transparent.

3. The encoder of claim 1, wherein the code strip comprises a plurality of interleaved dark regions and light regions, the first resolution defined as a number of dark region-light region pairs per distance unit, the dark regions of the code strip being opaque and the light regions of the code strip being slits or windows.

4. The encoder of claim 1, wherein the second resolution is defined as a number of the optical sensors per distance unit divided by a number of unique encoder states, and the code strip is positioned between the light emitters and the optical sensors.

5. The encoder of claim 1, wherein movement of the array of the optical sensors in relation to the code strip causes the optical sensors each to substantially detect light from the light emitters where a light region of the code strip is incident thereto and to substantially not detect light from the light emitters where a dark region of the code strip is incident thereto.

6. The encoder of claim 1, wherein the hardware circuit outputs the unique encoder states at the resolution equal to the second resolution without performing interpolation.

7. The encoder of claim 1, wherein the hardware circuit comprises one or more outputs, the number of unique encoder states corresponding to a number of unique combinations of values of the outputs of the hardware circuit.

8. The encoder of claim 1, wherein the hardware circuit comprises a plurality of inputs equal in number to the optical sensors of the array.

9. The encoder of claim 1, wherein
    the optical sensors comprise eight optical sensors including a first sensor, a second sensor located before the first sensor, a third sensor located before the second sensor, a fourth sensor located before the third sensor, a fifth sensor located before the fourth sensor, a sixth sensor located before the fifth sensor, a seventh sensor located before the sixth sensor, and an eighth sensor located before the seventh sensor,
    the comparators comprise four comparators including a first comparator, a second comparator, a third comparator, and a fourth comparator,
    the XOR gates comprise two XOR gates including a first XOR gate and a second XOR gate,
    the first comparator comparing the outputs of the first sensor and the fifth sensor, the second comparator comparing the outputs of the third sensor and the seventh sensor, the third comparator comparing the outputs of the fourth sensor the eighth sensor, and the fourth comparator comparing the outputs of the second sensor and the sixth sensor, and
    the first XOR gate performing a logic XOR operation on the outputs of the first and the second comparators, and the second XOR gate performing a logic XOR operation on the outputs of the third and the fourth comparators.

10. The encoder of claim 1, wherein
    the array of optical sensors is a first array of optical sensors,
    the encoder further comprises a second array of optical sensors adjacent to the first array of optical sensors, outputs of the optical sensors of the second array related to the outputs of the optical sensors of the first array such that the second array is supplemental to the first array, and the second resolution is unaffected by the second array.

11. The encoder of claim 1, wherein the second resolution is an integer multiple of the first resolution.

12. The encoder of claim 1, wherein the number of unique encoder states is four, such that the encoder is a quadrature encoder.

13. A printing device comprising:
a carriage;
a printing mechanism on the carriage, the carriage movable along a first dimension with respect to a media sheet that is movable in a second dimension perpendicular to the first dimension; and,
a digital encoder to track movement of the printing mechanism in the first dimension, the digital encoder having a resolution provided without interpolation by a hardware circuit and that is greater than a resolution of a code strip of the digital encoder,
wherein the digital encoder comprises:
the code strip including a plurality of interleaved dark regions and light regions, the resolution of the code strip defined as a number of dark region-light region pairs per distance unit;
one or more light emitters;
an array of optical sensors having a resolution defined as a number of the optical sensors per distance unit divided by a number of unique digital encoder states, the code strip positioned between the light emitters and the optical sensors; and,
the hardware circuit to output the unique digital encoder states based on outputs of the optical sensors at the resolution of the digital encoder equal to the resolution of the array,
wherein the hardware circuit comprises:
a plurality of comparators, each comparator comparing the outputs of two of the optical sensors; and,
one or more exclusive-or (XOR) gates, each XOR gate performing a logic XOR operation on outputs of two different comparators of the comparators, such that the output of each comparator is connected to just one of the XOR gates, and such that all the comparators are connected to the XOR gates.

14. The printing device of claim 13, wherein the hardware circuit comprises one or more outputs, the number of unique digital encoder states corresponding to a number of unique combinations of values of the outputs of the hardware circuit.

15. The printing device of claim 13, wherein the hardware circuit comprises a plurality of inputs equal in number to the optical sensors of the array.

16. The printing device of claim 13, wherein
the array of optical sensors is a first array of optical sensors,
the digital encoder further comprises a second array of optical sensors adjacent to the first array of optical sensors, outputs of the optical sensors of the second array related to the outputs of the optical sensors of the first array such that the second array is supplemental to the first array,
and the resolution of the first array is unaffected by the second array.

17. The printing device of claim 13, wherein the number of unique digital encoder states is four, such that the digital encoder is a digital quadrature encoder.

18. The printing device of claim 13, wherein the printing mechanism is an inkjet-printing mechanism, such that the printing device is an inkjet-printing device.

19. The printing device of claim 13, wherein
the optical sensors comprise eight optical sensors including a first sensor, a second sensor located before the first sensor, a third sensor located before the second sensor, a fourth sensor located before the third sensor, a fifth sensor located before the fourth sensor, a sixth sensor located before the fifth sensor, a seventh sensor located before the sixth sensor, and an eighth sensor located before the seventh sensor,
the comparators comprise four comparators including a first comparator, a second comparator, a third comparator, and a fourth comparator,
the XOR gates comprise two XOR gates including a first XOR gate and a second XOR gate,
the first comparator comparing the outputs of the first sensor and the fifth sensor, the second comparator comparing the outputs of the third sensor and the seventh sensor, the third comparator comparing the outputs of the fourth sensor the eighth sensor, and the fourth comparator comparing the outputs of the second sensor and the sixth sensor, and
the first XOR gate performing a logic XOR operation on the outputs of the first and the second comparators, and the second XOR gate performing a logic XOR operation on the outputs of the third and the fourth comparators.

* * * * *